United States Patent
Warsop et al.

(10) Patent No.: US 12,024,280 B2
(45) Date of Patent: Jul. 2, 2024

(54) VEHICLE CONTROL

(71) Applicant: BAE Systems plc, London (GB)

(72) Inventors: Clyde Warsop, Bristol (GB); Ian Lunnon, Manchester (GB); William James Crowther, Manchester (GB)

(73) Assignee: BAE Systems plc, London (GB)

( * ) Notice: Subject to any disclaimer, the term of this patent is extended or adjusted under 35 U.S.C. 154(b) by 223 days.

(21) Appl. No.: 17/635,574

(22) PCT Filed: Sep. 3, 2020

(86) PCT No.: PCT/GB2020/052104
§ 371 (c)(1),
(2) Date: Feb. 15, 2022

(87) PCT Pub. No.: WO2021/044143
PCT Pub. Date: Mar. 11, 2021

(65) Prior Publication Data
US 2022/0315208 A1 Oct. 6, 2022

(30) Foreign Application Priority Data

Sep. 3, 2019 (GB) ..................................... 1912638
Oct. 22, 2019 (EP) ..................................... 19275103

(51) Int. Cl.
*B64C 19/00* (2006.01)
*B64C 3/14* (2006.01)
(Continued)

(52) U.S. Cl.
CPC ............. *B64C 3/141* (2013.01); *B64C 15/14* (2013.01); *B64C 19/00* (2013.01); *B64C 21/04* (2013.01);
(Continued)

(58) Field of Classification Search
CPC ............................... B64C 15/14; B64C 21/04
See application file for complete search history.

(56) References Cited

U.S. PATENT DOCUMENTS 2,451,008 A * 10/1948 Williams ................ B64C 15/14
244/221
2,928,627 A * 3/1960 Johnson ................ B64D 27/18
244/15
(Continued)

FOREIGN PATENT DOCUMENTS

EP    0518345 A1    12/1992
EP    2059441 A1     5/2009
(Continued)

OTHER PUBLICATIONS

PCT International Search Report and Written Opinion of PCT Application No. PCT/GB2020/052104, mail date Nov. 4, 2020, 14 pages.

(Continued)

*Primary Examiner* — Christopher D Hutchens
(74) *Attorney, Agent, or Firm* — Maine Cernota & Curran (57) ABSTRACT

The present disclosure relates to a control system for a vehicle, comprising: at least one compressor arranged to generate compressed fluid having a massflow rate; at least one fluidic control effector in fluidic communication with the at least one compressor and arranged to change the direction of travel of the vehicle when the compressed fluid is incident on the at least one fluidic control effector; a dump duct for expelling excess compressed fluid not delivered to the at least one fluidic control effector out of the vehicle; a dump valve for controlling the massflow rate of compressed fluid delivered to the dump duct; and a controller electrically coupled to the dump valve and configured to adjust the dump valve. The present disclosure also relates to an aircraft (Continued)

having the control system and a method of controlling a vehicle.

9 Claims, 6 Drawing Sheets

(51) Int. Cl.

| | | |
|---|---|---|
| *B64C 15/14* | (2006.01) | |
| *B64C 21/04* | (2023.01) | |
| *B64C 21/08* | (2023.01) | |
| *B64C 39/02* | (2023.01) | |
| *G05D 1/00* | (2006.01) | |
| *G05D 7/06* | (2006.01) | |
| *B64U 30/10* | (2023.01) | |

(52) U.S. Cl.
CPC ............ *B64C 21/08* (2013.01); *B64C 39/024* (2013.01); *G05D 1/101* (2013.01); *G05D 7/0635* (2013.01); *B64U 30/10* (2023.01)

(56) References Cited

U.S. PATENT DOCUMENTS

| | | | | |
|---|---|---|---|---|
| 2,946,540 | A * | 7/1960 | Coanda | B64C 21/04 244/15 |
| 2,969,206 | A | 1/1961 | Jensen | |
| 3,246,863 | A | 4/1966 | Posingies | |
| 3,920,203 | A * | 11/1975 | Moorehead | F02K 1/70 244/81 |
| 4,534,702 | A * | 8/1985 | Johnson, Jr. | B64C 27/325 416/31 |
| 4,713,935 | A * | 12/1987 | Szuminski | B64D 33/04 60/229 |
| 4,860,976 | A * | 8/1989 | McFadden | B64C 21/04 244/199.1 |
| 5,899,416 | A * | 5/1999 | Meister | B64C 21/06 244/87 |
| 7,104,499 | B1 * | 9/2006 | Arata | B64C 15/02 244/12.3 |
| 7,823,840 | B2 * | 11/2010 | Shmilovich | B64C 9/38 244/215 |
| 8,033,510 | B2 | 10/2011 | Shmilovich | |
| 8,087,618 | B1 * | 1/2012 | Shmilovich | B64C 21/04 244/215 |
| 8,191,820 | B1 * | 6/2012 | Westra | B64C 5/12 244/49 |
| 9,108,725 | B1 * | 8/2015 | Shmilovich | B64C 21/04 |
| 9,573,679 | B2 * | 2/2017 | Gölling | F15C 1/12 |
| 9,587,585 | B1 * | 3/2017 | Rolling | B64C 9/38 |
| 9,656,740 | B2 * | 5/2017 | Gölling | B64C 13/16 |
| 9,714,082 | B2 * | 7/2017 | Shmilovich | B64C 21/08 |
| 9,889,924 | B2 * | 2/2018 | Harrison | B64C 23/00 |
| 9,944,383 | B2 * | 4/2018 | Williams | B64C 39/024 |
| 10,556,671 | B2 * | 2/2020 | Warsop | B64C 21/08 |
| 10,611,465 | B2 * | 4/2020 | Lee | B64C 13/16 |
| 10,787,245 | B2 * | 9/2020 | Duffy | B64C 21/04 |
| 11,149,633 | B2 * | 10/2021 | Wang | B64D 27/20 |
| 2001/0045311 | A1 | 11/2001 | Miyazawa | |
| 2009/0050734 | A1 | 2/2009 | Cook et al. | |
| 2014/0103134 | A1 | 4/2014 | Raghu | |
| 2015/0275758 | A1 * | 10/2015 | Foutch | F02C 7/047 60/785 |
| 2016/0068270 | A1 * | 3/2016 | Meyer | B64C 21/04 137/15.1 |
| 2017/0057621 | A1 | 3/2017 | Evulet | |
| 2017/0081031 | A1 * | 3/2017 | Bammann | B64D 13/04 |
| 2017/0088253 | A1 | 3/2017 | Willams et al. | |
| 2022/0315208 | A1 * | 10/2022 | Warsop | G05D 1/101 |

FOREIGN PATENT DOCUMENTS

| | | |
|---|---|---|
| EP | 3144221 A1 | 3/2017 |
| GB | 1448017 A | 9/1976 |

OTHER PUBLICATIONS

Magill J et al: "Dynamic Stall Control Using a Model-Based Observer", Journal of Aircraft. AIAA—American Institute of Aeronautics and Astronautics, Inc, US, vol. 40, No. 2, Mar. 1, 2003 (Mar. 1, 2003), pp. 355-362, XP001144377, ISSN:0021-8669.
European Search Report Application No. EP 19275103.0, mail date Apr. 6, 2020, 8 pages.
Great Britain Search Report Application No. GB 1912638.2, mail date Feb. 17, 2020, 4 pages.
Dressel L and M Kochenderfer: "Hunting Drones with Other Drones: Tracking a Moving Radio Target", 2019 International Conference on Robotics and Automation (ICRA), May 20-24, 2019, 1905-1912, Montreal, Canada.
Davies L et al: "Review of Unmanned Aircraft System Technologies to Enable Beyond Visual Line of Sight (BVLOS) Operations," 2018 X International Conference of Electrical Power Drive Systems (ICEPDS), 2018.
PCT International Search Report and Written Opinion of PCT Application No. PCT/GB2020/052102, mail date Nov. 2, 2020, 14 pages.
Lino Guzzella et al: "Introduction to Modeling and Control of Internal Combustion Engine Systems—A Basics of Modeling and Control-Systems Theory", Jan. 1, 2010 (Jan. 1, 2010), pp. 221-354, XP055686981, Retrieved from the Internet: URL: https://link.springer.com/content/pdf/bbm:978-3-642-10775-7/1.pdf [retreived on Apr. 14, 2020] p. 261-p. 264.
European Search Report Application No. 19275104.8, mail date Apr. 29, 2020, 10 pages.
Great Britain Search Report Application No. 1912636.6, mail date Feb. 17, 2020, 4 pages.
International Preliminary Report on Patentability of PCT Application No. PCT/GB2020/052102, mail date Mar. 17, 2022, 8 pages.
International Preliminary Report on Patentability of PCT Application No. PCT/GB2020/052104, mail date Mar. 17, 2022, 8 pages.
Hoholis; George: "Assessment of Fluidic Control Effectors using Computational Fluid Dynamics" Diss. University of Liverpool, 2016, 154 pages.
Office Action for U.S. Appl. No. 17/635,628 mail date Mar. 15, 2024, 34 pages.

* cited by examiner

VEHICLE CONTROL

RELATED APPLICATIONS

This application is a national phase application filed under 35 USC § 371 of PCT Application No. PCT/GB2020/052104 with an International filing date of Sep. 3, 2020, which claims priority of GB Patent Application 1912638.2 filed Sep. 3, 2019, and of EP Patent Application 19275103.0 filed on Oct. 22, 2019. All of these applications are incorporated herein by reference in their entirety for all purposes.

FIELD

The present disclosure relates to a control system for a vehicle. The present disclosure also relates to a vehicle and a method of controlling a vehicle.

BACKGROUND

Figure 1:
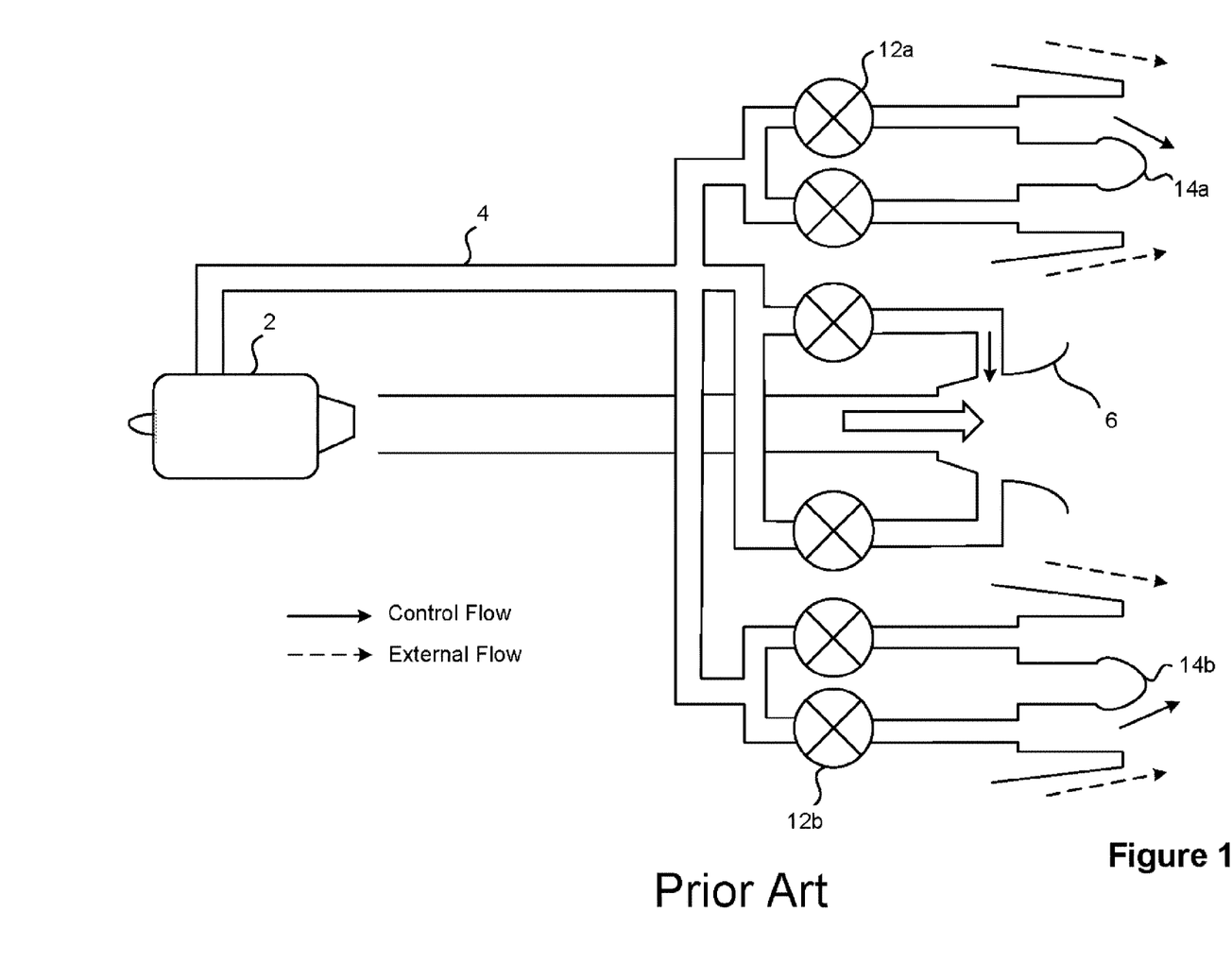
FIG. 1 is a system diagram of a prior art fluidic control system.

Fluidic flight control systems, as demonstrated in FIG. 1, are known. Here, air is bled off the main aircraft engine 2 and directed to fluidic control effectors 14, for example on the wings or tail surfaces of the aircraft, by way of a fluidic bleed path 4.

However, most modern jet engines tend not to support a bleedmass offtake above 3% of the total massflow rate. This can be challenging where engine bleedmass offtake is required for pilot life support, cooling avionics, de-icing etc., as the engine cannot then also support bleedmass offtake for fluidic flight control without significant loss of power.

Further, the nature of flight means that fluidic control effectors 14 experience continuously varying demands as the aircraft has to respond to pilot inputs and to stabilize the aircraft in response to atmospheric turbulence and gusts. For an aircraft controlled using fluidic control effectors 14 driven by engine 2 bleed air this means that there is a continuously time varying demand for bleed air ranging from zero to maximum. The impact of such variations tends to impact engine stability.

Therefore, there is a demand for an improved fluidic control system that does not rely on main engine bleedmass.

SUMMARY

According to a first aspect of the present disclosure, there is provided a control system for a vehicle, comprising:
at least one compressor arranged to generate compressed fluid having a massflow rate;
at least one fluidic control effector in fluidic communication with the at least one compressor and arranged to change the direction of travel of the vehicle when the compressed fluid is incident on the at least one fluidic control effector;
a dump duct for expelling excess compressed fluid not delivered to the at least one fluidic control effector out of the vehicle;
a dump valve for controlling the massflow rate of compressed fluid delivered to the dump duct; and
a controller electrically coupled to the dump valve and configured to adjust the dump valve.

Advantageously, the control system reduces the demand on the main vehicle engine while remaining highly responsive to control inputs by providing a dedicated constant-operation compressor that dumps compressed fluid unless the compressed fluid is demanded by a control effector.

The controller may be configured to:
receive a vehicle control input indicating a demanded vehicle manoeuvre; and
determine a required massflow rate at the at least one fluidic control effector to effect the vehicle manoeuvre.

The controller may be configured to adjust the dump valve to provide the compressed fluid at the determined massflow rate to the at least one fluidic control effector.

The control system may comprise a flowrate sensor disposed between the compressor and the dump valve, and the controller may be configured to:
use the flowrate sensor to measure an instantaneous massflow rate;
compare the instantaneous massflow rate with a predetermined massflow rate; and
adjust the dump valve such that the instantaneous massflow rate is equal to the predetermined massflow rate.

The predetermined massflow rate may be an expected massflow rate based on compressor operating conditions, and the controller may be configured to calculate the expected massflow rate.

The control system may comprise a control valve disposed in an actual or intended fluid flow between the dump valve and the at least one fluidic control effector, wherein the control valve is in electrical communication with the controller, and the controller may be configured to:
adjust the control valve in dependence on the vehicle control input such that compressed fluid is directed to the at least one fluidic control effector at the determined massflow rate to effect the vehicle manoeuvre.

The control system may comprise a plurality of fluidic control effectors and a plurality of control valves, wherein each fluidic control effector is associated with a respective one of the control valves.

The controller may comprise first and second processors, wherein the first processor is configured to adjust the dump valve and the second processor is configured to receive the vehicle control input and to adjust the control valve.

The at least one compressor may comprise a plurality of interconnected compressors.

The dump duct may be arranged to terminate at the rear of a vehicle such that the expelled compressed fluid provides thrust to the vehicle.

The dump duct may comprise an ejector nozzle to mix expanded compressed fluid with an external fluid flow.

The dump valve may comprise a sleeve valve. Alternatively, the dump valve may comprise a butterfly valve.

The fluid may comprise air. Alternatively, the fluid may comprise water.

According to a second aspect of the present disclosure, there is provided an aircraft comprising a control system according to the first aspect for causing the aircraft to execute a manoeuvre.

The aircraft may be an unmanned aircraft.

The aircraft may comprise:
a fuselage;
first and second wing members disposed on opposite sides of the fuselage; and
first and second fluidic control effectors, wherein the first fluidic control effector is disposed on an outer part of the trailing edge of the first wing member and the second fluidic control effector is disposed on an outer part of the trailing edge of a second wing member of the aircraft.

According to a third aspect of the present disclosure, there is provided a method of controlling a vehicle, comprising:

generating, by a compressor, compressed fluid and opening a dump valve such that the compressed fluid is expelled from the vehicle;

receiving a vehicle control input indicating a demanded vehicle manoeuvre;

determining a compressed fluid massflow rate required by at least one fluidic control effector to effect the vehicle manoeuvre; and adjusting the dump valve such that the compressed fluid flows to the at least one fluidic control effector at the determined massflow rate.

The method may comprise:

measuring an instantaneous massflow rate between the compressor and the dump valve;

comparing the instantaneous massflow rate with a predetermined massflow rate; and adjusting the dump valve such that the instantaneous massflow rate is equal to the predetermined massflow rate.

The method may comprise calculating an expected massflow rate based on compressor operating conditions, wherein the predetermined massflow rate is the expected massflow rate.

The method may comprise adjusting at least one control valve disposed between the dump valve and the at least one fluidic control effector such that the compressed fluid flows to the at least one fluidic control effector at the determined massflow rate.

It will be appreciated that features described in relation to one aspect of the present disclosure can be incorporated into other aspects of the present disclosure. For example, an apparatus of the disclosure can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the disclosure will now be described by way of example only and with reference to the accompanying drawings.

For convenience and economy, the same reference numerals are used in different figures to label identical or similar elements.

DETAILED DESCRIPTION

Generally, embodiments herein relate to a fluidic control system for a vehicle, the system comprising a compressor in constant operation. A dump duct is used to channel the compressed fluid away from control effectors unless it is demanded by the control effectors to effect movement of the aircraft. In one embodiment, when a control input is received, a controller closes a dump valve and opens a control valve by an amount depending on the amount of vehicle path deviation indicated by the control input. In another embodiment, the controller uses a sensor to determine whether the massflow rate of fluid in the system is equal to the expected massflow rate generated by the compressor at that time. The dump valve is then adjusted such the measured massflow rate is substantially equal to the expected massflow rate. The fluid is preferably air, and the vehicle is preferably an aircraft.

Massflow is also known as mass transfer or bulk flow. It relates to the movement of fluids, such as air or water, down a pressure gradient.

For many years, researchers have been seeking alternatives to conventional moving control surfaces for controlling an aircraft in flight in order to reduce the impact that these moving devices have on weight, volume occupied, reliability, maintenance and cost. One such alternative approach is the use of so-called "fluidic control systems", which embodiments of the present disclosure improve upon. The general prior art concept is demonstrated broadly in FIG. 1. The term "fluidic control systems" encompasses a wide range of approaches, examples of which include circulation control, leading edge blowing and fluidic thrust vectoring.

Each fluidic control technique works on the principle of using the suction or blowing of air through engineered slots and/or holes located in appropriate places on the aircraft surface to change the way in which the external flow behaves. For example, in the case of 'circulation control' air is blown through slots over a curved surface located in the trailing edge of a lifting surface (usually a wing but it is equally applicable to tails and fins) to change the local flow characteristics in that region and, through a 'fluid dynamic coupling', the flow around the entire lifting surface. This change in the flow results in a change in the lift and moment acting on the lifting surface in a similar manner that deflecting a flap or conventional control surface would achieve. In the case of fluidic thrust vectoring, the injection of gas takes place through slots/or holes within the exhaust nozzle 6 of the jet engine 2. Combined with appropriate shaping of the nozzle 6 geometry this fluid injection causes an asymmetry in the jet flow causing it to be deflected (vectored). The vectoring of the exhaust jet results in a change in the forces/moments it imparts about the centre of gravity of the aircraft, resulting in a change in aircraft attitude. The combinations of slots and/or holes and curved surfaces or nozzle geometry are referred to generally as fluidic control effectors 14a, 14b (generally 14).

One specific example of a fluidic control effector 14 is a trailing edge circulation control characterized by the blowing of a tangential jet sheet through spanwise slots placed just upstream of a cylindrical trailing edge. The jet sheet remains attached to the cylindrical surface and entrains the air passing over the upper surface of the wing through the Coanda effect. As a consequence, circulation develops around the airfoil and a lift increment is generated in a similar way to that produced from a conventional trailing edge flap. By independently controlling blowing from the upper and lower slots on a trailing edge, it is possible to control wing circulation (lift) in both a positive and negative sense, thereby creating the same effect as a conventional control surface that may be deflected both upward and downward. The dual-slot circulation control concept can also be employed as a thrust/yaw generating device by operating both upper and lower blowing jets simultaneously. A further embodiment of the dual-slot concept also allows for operation at continuous blowing whereby a control valve is used to modulate the percentage of the total flow rate applied to the upper and lower slots at any point in time. The advantage of such a system tends to be the ability to generate full control authority while operating the engine at a continuous bleed condition, which, under some circumstances, may be better for engine performance.

In general, the designer of a fluidic control system uses their knowledge of fluid interactions to maximise the gain achieved by the blowing/suction effect, effectively relying on entrainment of, and receptivity and instability within, the local flow to achieve aerodynamic amplification of the effect the disturbance created by the fluidic input (suction or blowing) has.

Fluidic control systems require a source of high pressure air, for which the usual source is the compressor stages of a gas turbine engine 2. Studies have shown that a typical military aircraft driven by fluidic control effectors 14 alone could require peak bleed air massflow rate requirements of 3% and above. Bleed air can be taken off a gas turbine engine 2 at a stage appropriate to the massflow rate/pressure requirement of the fluidic control effectors 14. The use of gas turbine engine 2 bleed air for use by a fluidic flight control system is subject to numerous disadvantages for the efficient and safe operation of the engine 2.

With the advent of the 'more electric aircraft' airframe, engine designers are seeking to reduce bleed offtake from gas turbine engines 2 and to replace the bleed-air driven systems with electrically-driven ones. This is based on the reduced mass and volume of the components required to deliver power in the form of electricity being lower than that required for distributing compressed air.

In embodiments of the present disclosure, instead of engine 2 bleed air being directed to fluidic control effectors 14, compressed air is generated by a dedicated compressor 16 independent of the main propulsion engine 2. Some of these embodiments will now be described in more detail with reference to FIG. 2.

Figure 2:
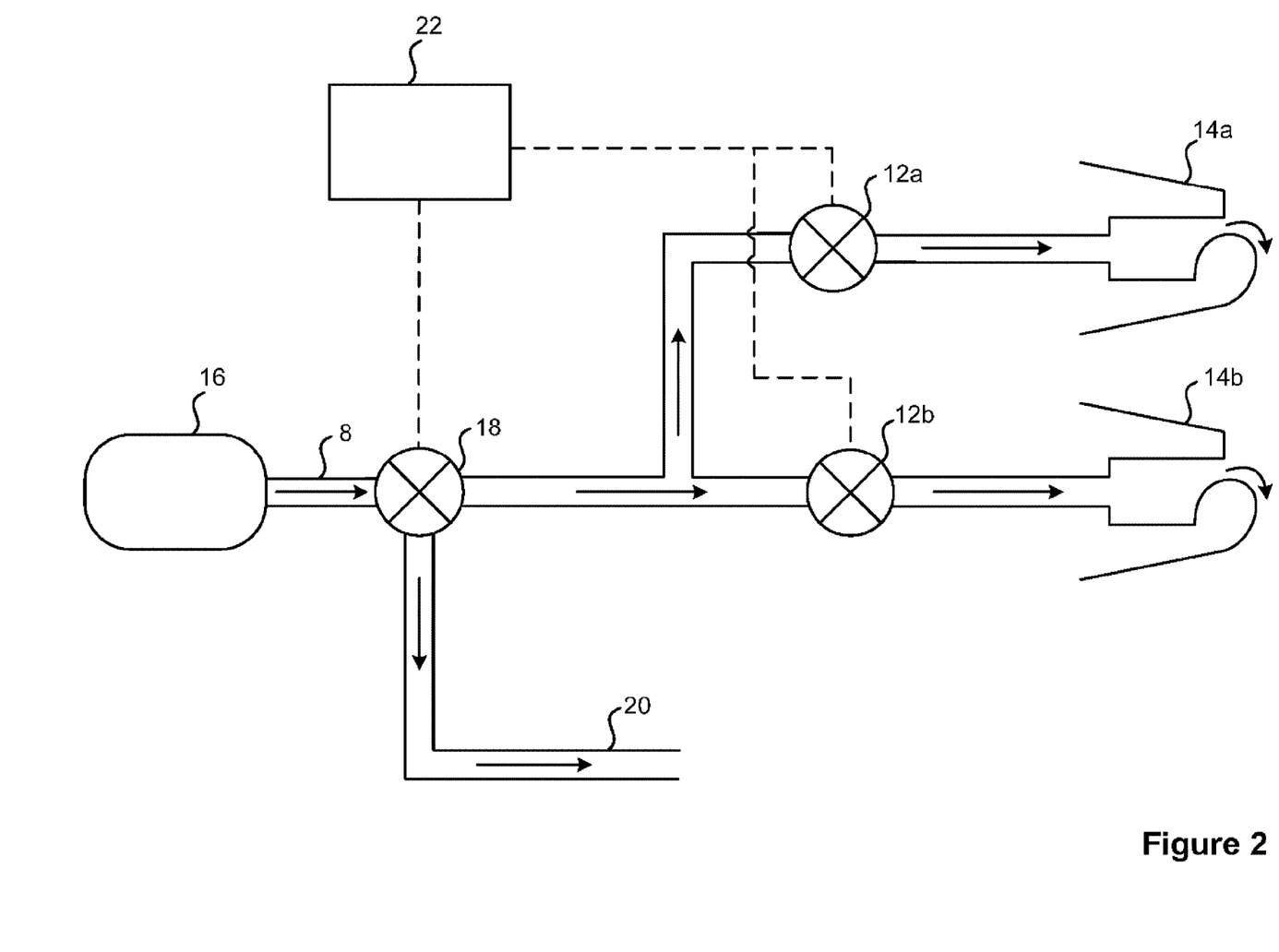
FIG. 2 is a system diagram of a fluidic control system according to embodiments.

While independent of the aircraft's main propulsion engine 2, the dedicated compressor 16 may be driven by electrical power generated by it. In some embodiments, battery storage of electrical power generated by the engine 2 is used to get over peak transient demands when the propulsion engine is at low throttle settings.

While a single compressor 16 is illustrated in each of the Figures, it would be appreciated that in some embodiments there are a plurality of independent compressors 16 distributed throughout the aircraft. Each compressor 16 may independently supply separate fluidic control effectors 14. In alternative embodiments again, there may be a plurality of interconnected compressors 16, which tends to overcome peak massflow rate demand and/or tends to provide a level of fail-safe such that an aircraft can return to land albeit with degraded capability in the event of a compressor 16 failure.

Using a dedicated compressor 16 tends to provide a number of advantages. For example, compressed air generated more locally to the fluidic control effectors 14 can reduce the mass and volume of the required pipework (ducting) 8, and also potentially eliminate some of the system routing issues that occur in prior art examples.

Electrical power generation cables tend to be much smaller and lighter than pneumatic ducts for delivery of an equivalent amount of power. Furthermore, independent compressor 16 systems (which may be, for example, electrically-driven or powered by small gas turbine or alternative-heat engines), can operate with less impact on the functioning of the primary propulsive engine 2. The impact of transient demands for bleed air on engine 2 stability is particularly reduced. Further again, independent compressor 16 systems de-couple the potential impact that engine 2 operating conditions (throttle setting, altitude, flight speed) have on the available bleed air massflow rate and pressure.

Compact, high-efficiency electrically-driven mixed-cycle compressors 16 are now becoming possible with recent developments in permanent magnet synchronous motor design, rare-earth magnets, and efficient power inverters based on silicon carbide MOSFETs. However, it has been found that fluidic flight control systems still require modification in order to be suitable for use with these types of compressors 16. Spooling up and down of a compressor 16 of the type suitable for delivering air of an effective volume and pressure to fluidic control effectors 14 takes significant time. Therefore, there exists a problem in that a compressor 16 suitable for delivering air at appropriate pressure and volume is unsuitable for supplying a fluidic control effector 14 that is required to operate transiently with a time constant of significantly less than one second. For example, delivering air at 1 kg/s at 3-4 bars to fluidic control effectors 14 tends to require a compressor approximately 200 mm in diameter and 800 mm in length, with an operational rotational speed of the order 60,000 rpm.

The massflow rate and pressure of compressed air required for effective operation of a fluidic control system, and consequently the size and performance of the compressor 16, depends on the size of the aircraft being controlled. Therefore, it would be appreciated that wide variations in massflow rate and pressure are possible. For example, pressure generated by a compressor 16 for fluidic control may be in the range of between 1 and 20 bar. Massflow rate is for example in the range of 1 kg/s to 6 kg/s, and preferably about 3 kg/s. The compressor 16 may be of suitable dimensions to achieve these pressures and massflow rates. For example, the compressor may be about 600 mm in diameter and about 1800 mm in length for a larger aircraft with many or high volume fluidic control effectors 14.

Embodiments of this disclosure provide a way of enabling a compact continuously-operating, high-performance compressor 16 to be used in a highly responsive (i.e. fast responding) fluidic flight control system while overcoming the problems of significant time-varying demands on compressed air massflow rate.

The compressor 16 output is coupled to fluidic control effectors 14 by way of ducting 8. The ducting 8 is metal piping. For example, the ducting 8 may be made of Inconel, which tends to have high strength and be resistant to high temperatures. The diameter of the ducting 8 is of the order of 25 mm up to about 100 mm depending on the aircraft size and whether the ducting 8 provides air for multiple fluidic control effectors 14a, 14b or is a side-branch delivering air to a single or small fluidic control effector 14a. Typical installations in a military aircraft have a maximum ducting 8 diameter of around 50 to 75 mm.

While only two fluidic control effectors 14a, 14b are demonstrated in the illustrated embodiment, in other embodiments there may be one or more fluidic control effectors 14. A first fluidic control effector 14a may be disposed on the outboard end of the port wing, while a second fluidic control effector 14b may be disposed on the outboard end of the starboard wing, for example, and when operated synergistically they cause the aircraft to roll. The fluidic control effectors 14 may additionally or alternatively be disposed on horizontal or vertical tail surfaces of the aircraft. The fluidic control effectors 14 may effectively replace an aircraft's slats, flaps, flaperons, ailerons, elevators or rudders, or be used for vectored thrust.

A dump valve 18 is disposed in the ducting 8 proximate to the exit of the compressor 16. The dump valve 18 is used to selectively direct the compressed air to continue along the ducting 8 towards the fluidic control effectors 14 and/or to direct the compressed air to flow into a dump duct 20. The dump valve 18 may be a butterfly or sleeve valve, for example.

Butterfly valves are generally used for controlling bleed air distribution as they tend to be simple, lightweight and reliable. However, butterfly valves do have a significantly non-linear response in terms of the massflow rate they deliver for a particular shaft displacement.

Sleeve valves are generally much heavier than butterfly valves and suffer more from leakage issues. However, the rotating sleeve can have a variable geometry cut-out allowing the massflow rate variation with valve shaft displacement to be more-easily controlled (typically made to be linear).

Individual effector control valves 12a, 12b (generally 12), each associated with a respective fluidic control effector 14a, 14b are disposed between the dump valve 18 and the fluidic control effectors 14a, 14b. The ducting 8 has a plurality of channels, where each channel is coupled to one respective fluidic control effector 14a, 14b. The effector control valves 12a, 12b are disposed in the respective channels. The effector control valves 12a, 12b may be a butterfly or sleeve valve, for example. In some embodiments, the dump valve 18 and effector control valves 12a, 12b have equal bandwidth to improve the responsivity of the fluidic control system.

The dump valve 18 and effector control valves 12a, 12b each comprise an electromechanical device, such as a servo, to open and close them in response to control signals.

In the embodiment illustrated in FIG. 2, the effector control valves 12a, 12b are coupled to a controller 22. In some embodiments, the dump valve 18 is coupled to the same controller 22. The controller 22 may take any suitable form. For instance, the controller 22 may be a microcontroller, plural microcontrollers, a processor, or plural processors. The controller 22 controls the dump valve 18 and the effector control valves 12a, 12b to prioritise the flow of compressed air to the fluidic control effectors 14 while maintaining a constant overall massflow rate from the compressor 16.

The controller 22 receives flight control input from the aircraft operator. The aircraft operator may input the flight control input through a user interface, such as a joystick or touchscreen. The aircraft may be manned or unmanned. Therefore, the aircraft operator may be a human pilot, a remote pilot, or a software module that automatically determines a heading and altitude for the aircraft based on pre-determined parameters. For example, the controller 22 may receive flight control input from an autopilot, or may itself be a feature of an autopilot. The controller 22 is configured to use the flight control input to determine the amount by which to open or close the dump valve 18 and effector control valves 12a, 12b. The flight control input indicates a desired (demanded) change of heading, attitude or altitude of the aircraft (i.e. a change in direction of the aircraft).

In some embodiments, for example where there is only a first fluidic control effector 14a but not a second fluidic control effector 14b, there may not be an effector control valve 12a associated with the fluidic control effector 14a. Instead, by closing the dump valve 18, compressed air is directed towards the fluidic control effector 14a. The pressure and volume of the compressed air at the fluidic control effector 14a is determined by the amount by which the dump valve 18 is open.

Any compressed air not utilised by the fluidic control effectors 14 is diverted by the dump valve 18 to the dump duct 20. The dump duct 20 opens into the atmosphere outside of the aircraft. This excess or unused compressed air is ducted to a point on the aircraft, through the dump duct 20, where it can be ejected efficiently as thrust. This tends to be advantageous in recouping the energy used in the compression of the air by the compressor 16. The exit of the dump duct 20 terminates with a suitably designed nozzle geometry to fully expand the flow to ambient pressure in order to maximise its propulsive thrust. In some embodiments, the propulsive thrust generated by the dumped air is further increased by coupling an ejector nozzle to the dump duct 20 exit that mixes the expanded dumped air with the external flow. This is ejector nozzle is also known as a thrust augmentation nozzle. For example, the dump duct 20 may terminate in a divergent nozzle (LAVAL nozzle) that has shaping that ensures the jet is expanded (without shockwaves) so that its static pressure at the exit is equal to the ambient external pressure. The nozzle can have a fixed geometry or can be variable so that it can be tuned for variations in pressure ratio that occur across the flight envelope. The dump duct 20 nozzle may be mounted inside another duct through which is used to entrain external air. The process of entrainment adds massflow rate to the system and enhances propulsive thrust (where thrust is equivalent to massflow rate×velocity).

The dump valve 18 and its controller 22 (or 230 in FIG. 4) tend to be sufficiently responsive to changing demands of the fluidic control effectors 14 in order that they have no significant impact on the supply of compressed air. By controlling the dump valve 18 and effector control valves 12 simultaneously, the performance of the compressor 16 can be optimised to provide a maximum airflow volume and pressure that is not in excess of that that could be required by the fluidic control effectors 14 at any one moment.

Figure 3:
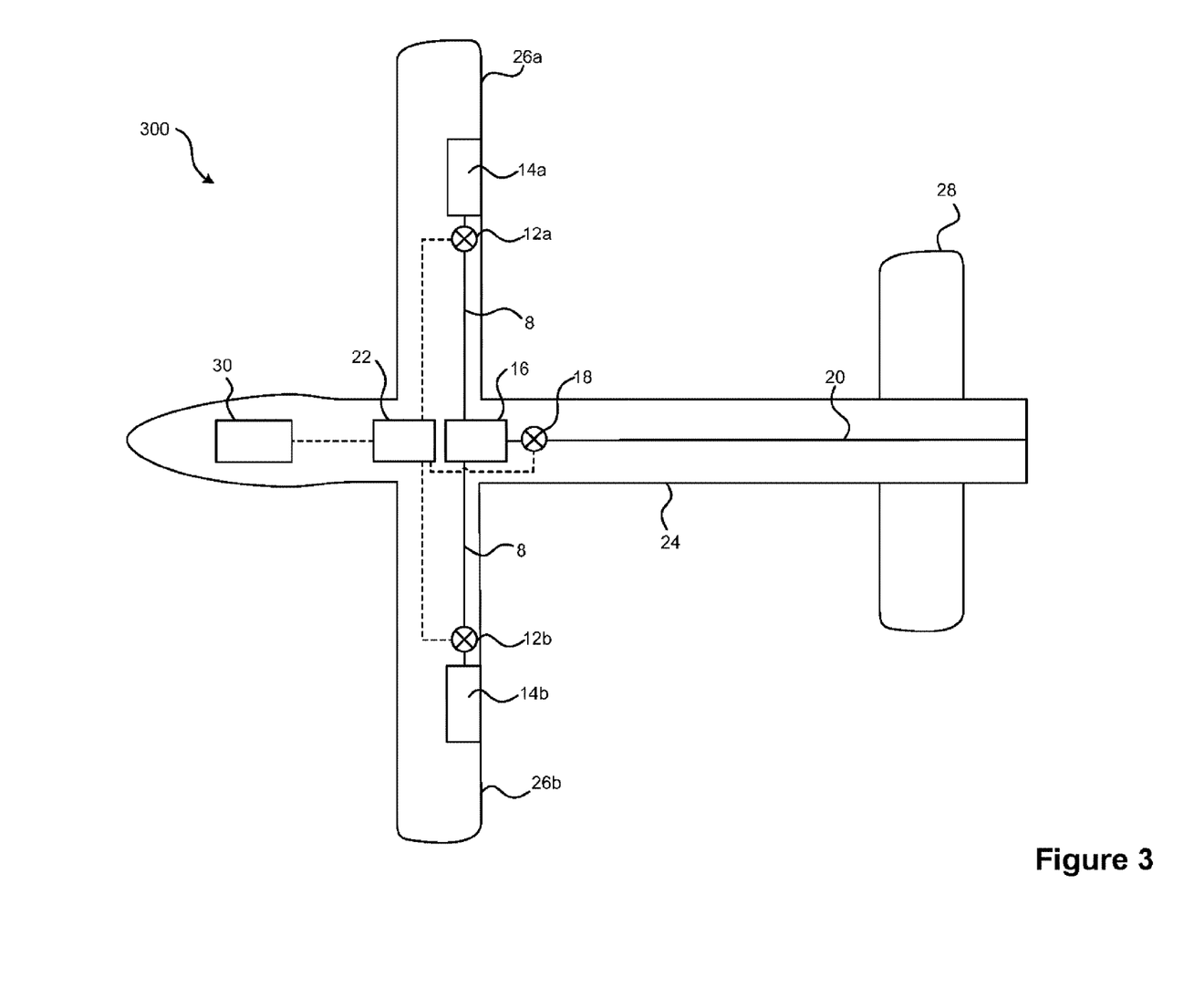
FIG. 3 is a plan view of an aircraft having the fluidic control system of FIG. 2.

An example of an aircraft 300 having an embodiment of the flight control system described with reference to FIG. 2 is shown in FIG. 3. The aircraft 300 includes wings 26a, 26b, a fuselage 24 and tail surfaces 28. The tail surfaces 28 may include horizontal and vertical stabilisers, or in other embodiments there may be a single stabiliser on either side of the fuselage 24 that can perform the function of a horizontal and vertical stabiliser. The vertical stabiliser may not be vertical. For example, in some embodiments the plane of the vertical stabiliser is arranged at about 45 degrees to the horizontal plane of the aircraft 300.

The aircraft 300 includes a user interface 30 for receiving flight control inputs from an aircraft operator. In other embodiments, where the aircraft 300 is unmanned, the user interface 30 is remote from the aircraft 300. The user interface 30 is electrically coupled to the controller 22. The controller 22 is electrically coupled to the effector control valves 12a, 12b. One effector control valve 12a is disposed in the starboard wing 26a and the other effector control valve 12*b* is disposed in the port wing 26*b*. The controller 22 is further coupled to the dump valve 18. The dump valve 18 selectively controls air to be channeled into the dump duct 20. The dump duct 20 terminates at the tail end of the aircraft 300, such that the ejected air can be used as thrust for the aircraft 300. A compressor 16 is fluidically coupled to the dump duct 20 and to the fluidic control effectors 14 disposed in the wings 26*a*, 26*b*. The effector control valves 12*a*, 12*b* control airflow to respective fluidic control effectors 14. The compressor 16 is coupled to the fluidic control effectors 14 and dump duct 20 by ducting 8.

For example, in the illustrated embodiment, the first fluidic control effector 14*a* is a curved surface on the starboard wing 26*a* that, when air is blown over it, causes the starboard wing 26*a* to sink. The second fluidic control effector 14*b* is a curved surface on the port wing 26*b* that, when air is blown over it, causes the port wing to sink. Therefore, by not blowing air through either fluidic control effector 14*a*, 14*b*, the aircraft 300 flies level, but can be banked by blowing air through either fluidic control effector 14*a*, 14*b*. To effect a shallow bank to starboard, the controller 22 may open the effector control valve 12*a* associated with the first fluidic control effector 14*a* by a small amount (for example, 20%). Simultaneously, the dump valve 18 may be controlled to close by a respective amount such that otherwise "wasted" air can be directed to the fluidic control effector 14*a* that demands it.

In another embodiment, the first fluidic control effector 14*a* and second fluidic control effector 14*b* may be physically coupled to form a single unit on one wing. Another unit having two fluidic control effectors 14*a*, 14*b* may be disposed on the other wing of the aircraft. Here, a first fluidic control effector 14*a* in a pair may be adapted to generate lift on the respective wing 26*a* when air is blown through it and the second fluidic control effector 14*b* in the pair may be adapted to cause the wing 26 to sink when air is blown through it.

Figure 4:
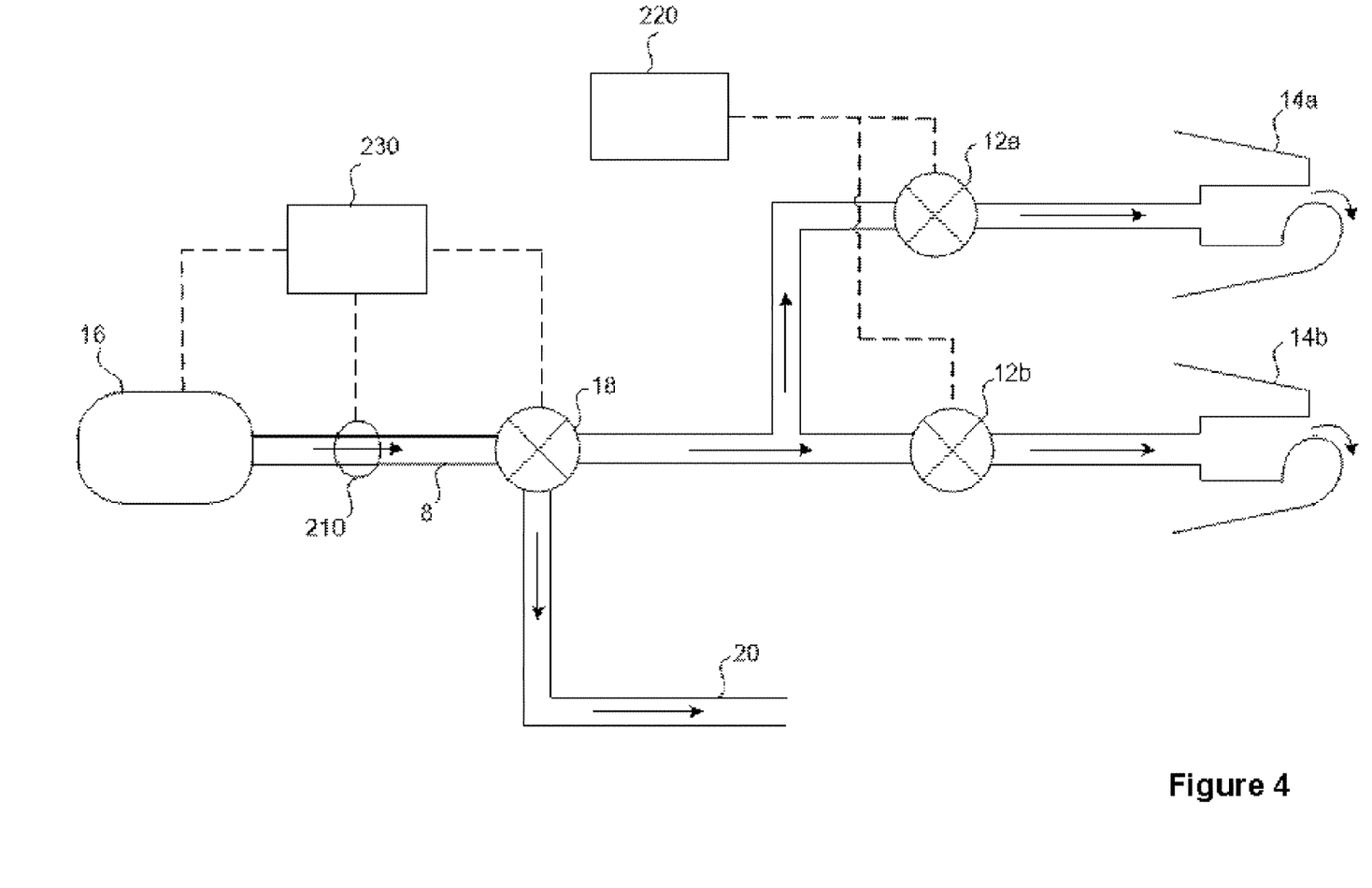
FIG. 4 is a system diagram of a fluidic control system according to further embodiments.

Further embodiments will now be described with reference to FIG. 4. These embodiments have much in common with those described with reference to FIG. 2, and description of common features, denoted by like reference numerals, will not be repeated.

At least one sensor 210, such as a venturimeter or other appropriate flow measuring device (flowmeter), is disposed in the actual or intended compressed air flow to measure the instantaneous flow rates within the ducting 8. Sensors 210 may be distributed through fluidic control system. For example, while a sensor 210 is illustrated as being disposed in the flowpath between the compressor 16 and the dump valve 18, other sensors 210 may be disposed proximate to the fluidic control effectors 14.

The sensor(s) 210 is coupled to a dump valve controller 230. The dump valve controller 230 is further coupled to the compressor 16. The dump valve controller 230 is configured to determine an expected flowrate of compressed air generated by the compressor 16 based on its operating conditions. The compressor's operating conditions may include its measured or otherwise known rotational speed. The expected flowrate for a given operating condition may be determined using a look-up table or coded algorithm. The dump valve controller 230 is configured to compare the measured instantaneous flowrates with the expected flowrate (i.e. to calculate an error between actual flowrate and expected flowrate for a given compressor 16 operating condition). The dump valve controller 230 then generates a control signal to cause the dump valve 18 to open or close in order to achieve a given total massflow rate dependent on compressor 16 operating conditions. In other words, the dump valve 18 is controlled to optimise the fluidic control system independently of flight control demands. The dump valve 18, compressor 16 and dump valve controller 230 provide a feedback loop.

In another embodiment, instead of an expected flowrate, the dump valve controller 230 compares the instantaneous flowrate with a desired flowrate and generates a control signal to control the dump valve 18 to maintain that flowrate through the sensor 210. The desired flowrate may be a predetermined flowrate.

A flight controller 220 is used to receive a control input, for example from a user interface 30, indicative of a demanded aircraft manoeuvre. The flight controller 220 is coupled to the effector control valves 12*a*, 12*b*. The flight controller 220 is configured to generate control signals to open or close the effector control valves 12*a*, 12*b* by an amount to cause compressed air to flow over respective fluidic control effectors 14*a*, 14*b* with a massflow rate to effect the aircraft manoeuvre. The flight controller 220 may be an autopilot.

In an example operation, the compressor 16 generates a predetermined, and desirably constant, massflow of air at a certain pressure. In the case when there is no massflow demand from the fluidic control effectors 14, the dump valve 18 will be controlled to open since it is the only means by which the compressor-generated massflow can be discharged. If an effector control valve 12 is opened to effect a manoeuvre, then the initial effect will be to increase the massflow taken off the compressor 16 (accompanied by a small drop in pressure too). The compressor 16 exit flowrate sensor 210 will detect this small increase in massflow demand and correspondingly the dump valve 18 will be controlled by the dump valve controller 230 to close a small amount to reduce the amount of dumped air so that it can be delivered to the respective fluidic control effector 14 while maintaining constant massflow output from the compressor 16.

In other words, the effector control valve 12 opening operation increases the massflow demand from the compressor 16 and the dump valve 18 closes to compensate (to allow massflow to the fluidic control effector 14) and to maintain overall constant massflow from the compressor 16). If the effector control valve 12 is subsequently closed, the overall massflow demand on the compressor 16 reduces and the dump valve 18 is controlled to open to compensate.

The dump valve controller 230 and the flight controller 220 may take any suitable form. For instance, the controllers 230, 220 may be a microcontroller, plural microcontrollers, a processor, or plural processors. In other words, while shown as discrete controllers, the function of the dump valve controller 230 and the flight controller 220 may be performed by a single controller, similarly to as illustrated in FIG. 2.

Figure 5:
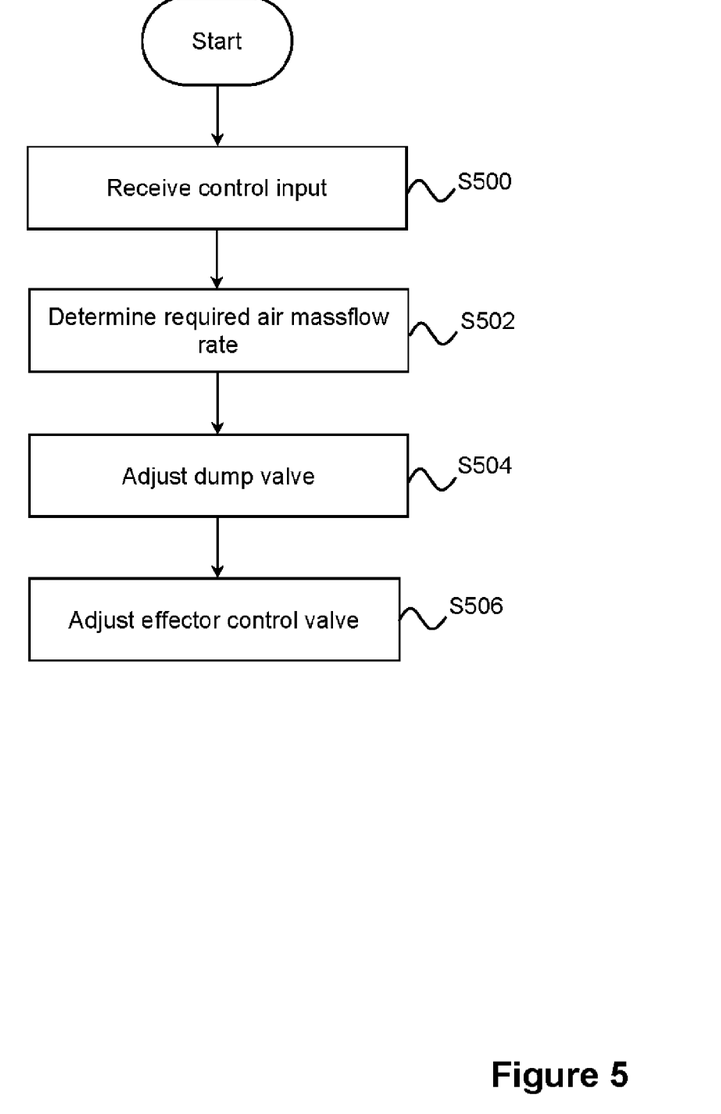
FIG. 5 is a flowchart showing a method of controlling an aircraft using the fluidic control system of FIG. 2.

A method of controlling a fluidic control system as described with respect to FIG. 2 will now be described with reference to FIG. 5. Here, in a first step S500 the controller 22 receives a control input, such as a request to bank or change the pitch of the aircraft 300. The control input may be received from a software module integrated with the controller 22. Alternatively, the control input may be received through a user interface 30. The control input is, for example, a command to change the heading, altitude or attitude of the aircraft 300.

In step S502, the controller 22 uses the control input determine the massflow rate required by the fluidic control effector(s) 14 to achieve the demanded control. This massflow rate required may depend on the rate of change of movement of the aircraft 300 that is demanded. The controller 22 then determines the amount by which to close the dump valve 18 and the amount by which to open the effector control valve(s) 12 in order to achieve the demanded mass-flow rate at the fluidic control effector(s) 14.

In step S504, the controller 22 generates a control signal to close the dump valve 18 by the determined amount. The control signal is transmitted to the electromechanical device operating the dump valve 18. The electromechanical device opens the dump valve 18 by the amount specified in the control signal.

Similarly, in step S506, the controller 22 generates a control signal to open the effector control valve(s) 12 by the determined amount. The control signal is transmitted to the electromechanical devices operating the effector control valve(s) 12. The electromechanical devices open each respective effector control valve 12a, 12b by the amount specified in the control signal.

While demonstrated here as discreet steps, step S504 and step S506 may occur simultaneously.

Figure 6:
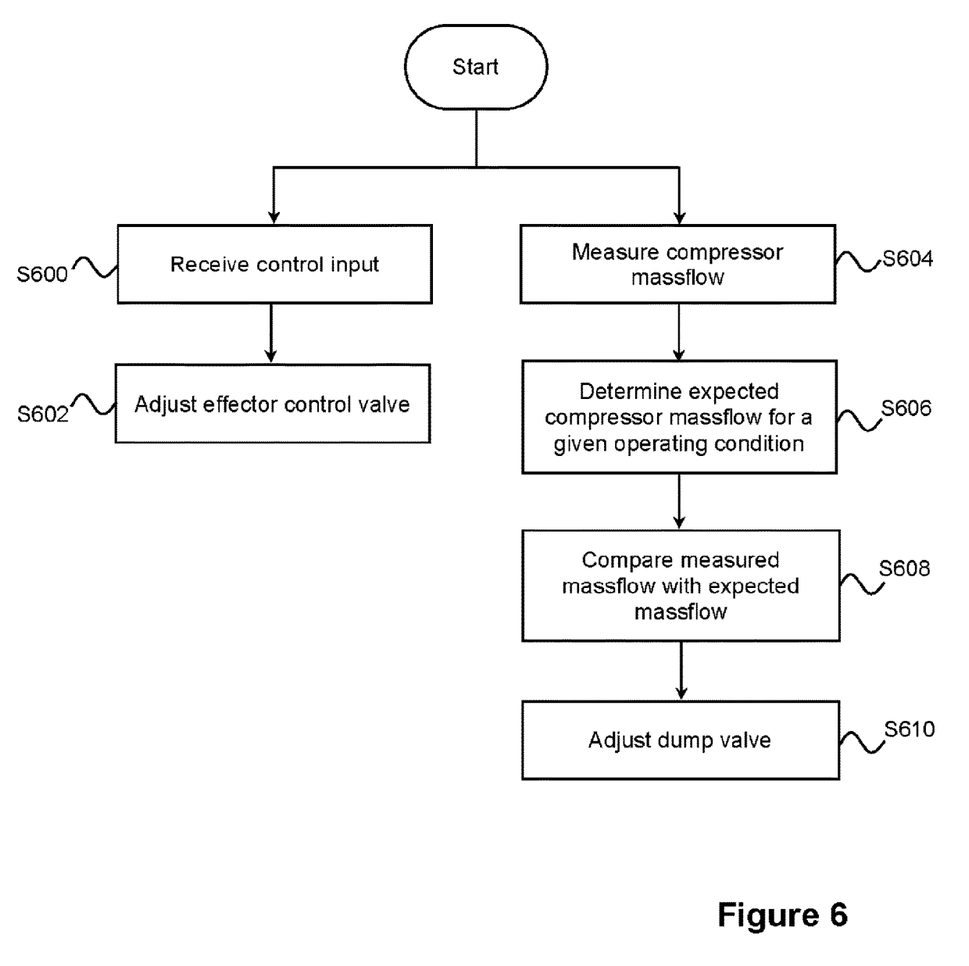
FIG. 6 is a flowchart showing a method of controlling an aircraft using the fluidic control system of FIG. 4.

A method of controlling a fluidic control system as described with respect to FIG. 4 will now be described with reference to FIG. 6. Here, in step S600 a control input is received indicating a demanding change in direction of the aircraft 300. In the following step, S620, the flight controller 220 determines an amount by which to open or close one or more of the effector control valves 12 to cause the demanded change in direction of the aircraft 300. The flight controller 220 transmits a control signal to the effector control valves 12 to cause them to open or close by the determined amount.

Entirely independently of step S600, at step S604 the sensor 210 measures the instantaneous massflow rate at the compressor 16 outlet and transmits the measurement to the dump valve controller 230. At step S606, the dump valve controller 230 determines an expected massflow rate at the compressor 16 based on the compressor's operating condition. Determining the expected massflow rate may comprise looking up the compressor's operating condition in a lookup table. This step may comprise measuring the current operating condition of the compressor 16, such as its throttle value or rotational speed. Step S604 and step S606 may occur in reverse order.

In step S608, the dump valve controller 230 compares the measured instantaneous massflow rate with the expected massflow rate. If they are not equal, the dump valve controller 230 generates a control signal to open or close the dump valve 18 by an amount to cause the expected and actual massflow rates to be equal in step S610. In other embodiments, if the difference between the expected and actual massflow rates is greater than a threshold value, the dump valve controller 230 generates a control signal to open or close the dump valve 18 by an amount to cause the difference between the expected and actual massflow rates to be less than the threshold in step S610.

In other words, the adjustment of the dump valve 18 is not directly dependent on a received control signal.

While the aircraft 300 is illustrated as an aeroplane in the embodiments described herein, it would be appreciated that the fluidic flight control system is applicable to other types of aircraft such as helicopters and airships. Further, the fluid being directed to the fluidic control effectors 14 is described throughout the present application as being air, but in other embodiments the fluid may be another gas such as argon or helium. The fluid may also be a liquid, such as water. Instead of an aircraft 300, the fluidic control system may be implemented in other types of vehicles, such as hovercraft, ships and submarines. Here, the fluidic control effectors 14 may be used in place of the traditional rudder or dive planes.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

What is claimed is:

1. An aircraft comprising a control system configured to cause the aircraft to execute a manoeuvre, the control system comprising:
   at least one compressor arranged to generate compressed fluid having a massflow rate;
   at least one fluidic control effector in fluidic communication with the at least one compressor and arranged to change the direction of travel of the aircraft when the compressed fluid is incident on the at least one fluidic control effector, the at least one fluidic control effector being associated with a respective control valve;
   a dump duct for expelling excess compressed fluid not delivered to the at least one fluidic control effector out of the aircraft;
   a dump valve for controlling the massflow rate of compressed fluid delivered to the dump duct;
   a flowrate sensor disposed between the compressor and the dump valve; and
   a controller electrically coupled to the dump valve and configured to adjust the dump valve and the at least one control valve
   wherein the controller is configured to:
      open the control valve to allow fluid to flow to the at least one fluidic control effector;
      use the flowrate sensor to measure an instantaneous massflow rate;
      compare the instantaneous massflow rate with a predetermined massflow rate; and
      adjust the dump valve such that the instantaneous massflow rate is equal to the predetermined massflow rate.

2. The aircraft according to claim 1, wherein the predetermined massflow rate is an expected massflow rate based on compressor operating conditions, and wherein the controller is configured to calculate the expected massflow rate.

3. The aircraft according to claim 1, wherein the at least one compressor comprises a plurality of interconnected compressors.

4. The aircraft according to claim 1, wherein the dump duct is arranged to terminate at a rear of the aircraft, such that the expelled compressed fluid provides thrust to the aircraft.

5. The aircraft according to claim 4, wherein the dump duct comprises an ejector nozzle to mix expanded compressed fluid with an external fluid flow.

6. The aircraft according to claim 1, wherein the dump valve further comprises a sleeve valve.

7. The aircraft according to claim 1, wherein the fluid comprises air.

8. A method of controlling an aircraft, comprising:
   generating, by a compressor, compressed fluid;

opening a dump valve such that the compressed fluid is expelled from the aircraft;

receiving a vehicle control input indicating a demanded aircraft manoeuvre;

opening a control valve to allow fluid to flow to a respective fluidic control effector;

measuring an instantaneous massflow rate between the compressor and the dump valve;

comparing the instantaneous massflow rate with a predetermined massflow rate; and adjusting the dump valve such that the instantaneous massflow rate is equal to the predetermined massflow rate.

9. The method according to claim 8, comprising calculating an expected massflow rate based on compressor operating conditions, wherein the predetermined massflow rate is the expected massflow rate.

* * * * *